June 18, 1946.　　　　J. C. RUMSEY　　　　2,402,297
SELF-PROPELLED VEHICLE CONSTRUCTION
Filed March 17, 1945　　　2 Sheets-Sheet 1

INVENTOR:
John C. Rumsey,
BY Chas W. Gerard
ATTORNEY

June 18, 1946.    J. C. RUMSEY    2,402,297
SELF-PROPELLED VEHICLE CONSTRUCTION
Filed March 17, 1945    2 Sheets-Sheet 2

INVENTOR:
John C. Rumsey,
BY Chas. W. Gerard
ATTORNEY

Patented June 18, 1946

2,402,297

UNITED STATES PATENT OFFICE 2,402,297

SELF-PROPELLED VEHICLE CONSTRUCTION

John C. Rumsey, Mission, Kans.

Application March 17, 1945, Serial No. 583,213

1 Claim. (Cl. 280—256)

The present invention relates to self-propelled vehicles, and aims to provide a novel and improved type of self-propelled wagon construction, having propelling mechanism of superior efficiency, as well as an improved type of steering construction.

One primary object of the invention is to provide a wagon type of self-propelled vehicle which is not only of a neat and attractive design but also adapted to be efficiently propelled while the driver is in a seated position, the improved construction also including steering mechanism which is very convenient as well as easy and efficient in its operation.

A further feature of the invention is the provision of an improved wagon design of the type described which includes a seat structure or unit having storage facilities and being also of a removable character for affording a vehicle body of plain wagonbed design.

It is a further object of the invention to provide a self-propelled vehicle of this character which is adapted for either juvenile or adult use, and also for operation in either direction, and with the operator or driver in either seated or upright or standing position.

With the foregoing general objects in view, the invention will now be described by reference to the accompanying drawings illustrating one form of wagon construction adapted to embody the principal characteristics of my invention, after which those features and combinations deemed to be novel and patentable will be particularly set forth and claimed.

Figure 1:
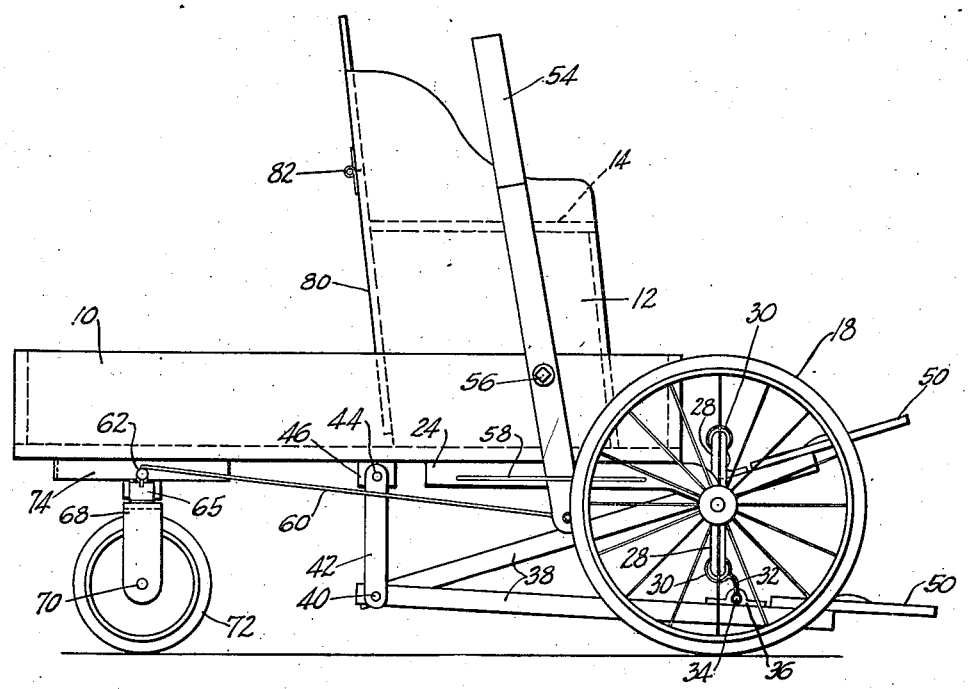
Figure 1 is a side elevation showing a vehicle construction embodying the present proposed features of improvement.
Figure 2:
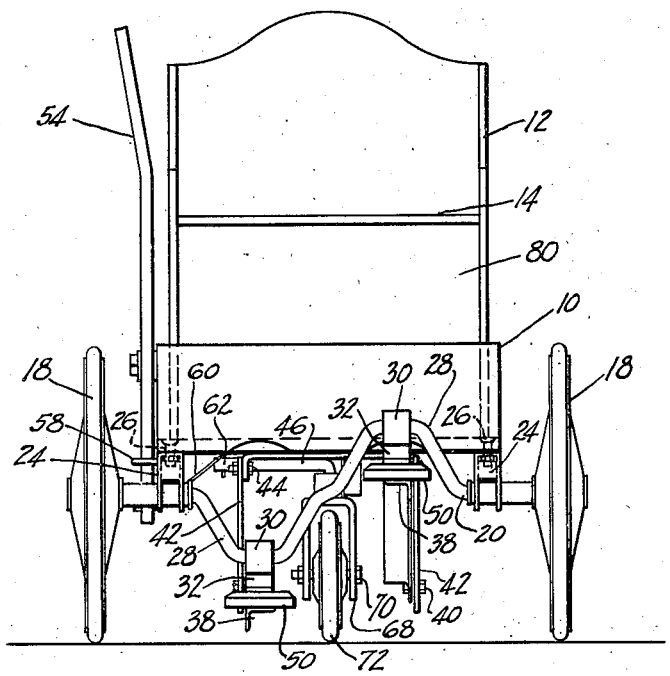
Figure 2 is a front elevation of the same.

Referring now to the accompanying drawings in detail, the improved vehicle construction is illustrated as comprising a main body portion providing a wagonbed 10 having the usual hauling or storage space, and in this space is removably mounted a seat structure or unit 12 providing a seat 14 of convenient height and a back portion 16, as illustrated in Figures 1 and 2. Being removably mounted as stated, this seat unit may be shifted to any desired position within the wagonbed; and also if desired the horizontal seat portion 14 may readily be made vertically adjustable, for accommodating the convenience of the driver.

The supporting and propelling wheels comprise a pair of duplicate wheels 18 of suitable diameter at opposite ends of a crank shaft 20, one of which wheels is rigid with the shaft (as by being keyed thereto as indicated at 19), while the other wheel may be simply loosely journaled thereon, for facilitating turning movements of the vehicle.

Adjacent its ends the shaft 20 is journaled in roller or any suitable type of antifriction bearings 22 which are mounted in the front ends of channel pieces 24 secured by bolts or screws 26 or the like to the bottoms of the front corners of the vehicle body. Intermediate said bearings 22 the crank shaft 20 is formed with oppositely acting crank portions 28, as clearly illustrated in Figure 2. Each of the cranks 28 is provided with a suitable antifriction or roller bearing unit 30 which is embraced by one end of a strap link 36, the other end of which is pivotally connected by means of a pin 34 and bracket 36 (see Figure 4) to the front end portion of a treadle member 38, shown as of angle iron construction having its rear end pivoted, as at 40, to the lower end of a drop link 42. Each of the drop links 42 is suspended from a pivot pin 44 mounted in a bracket 46 attached to the under face of the wagon bed 10—as illustrated in Figure 5.

Figures 3, 4:
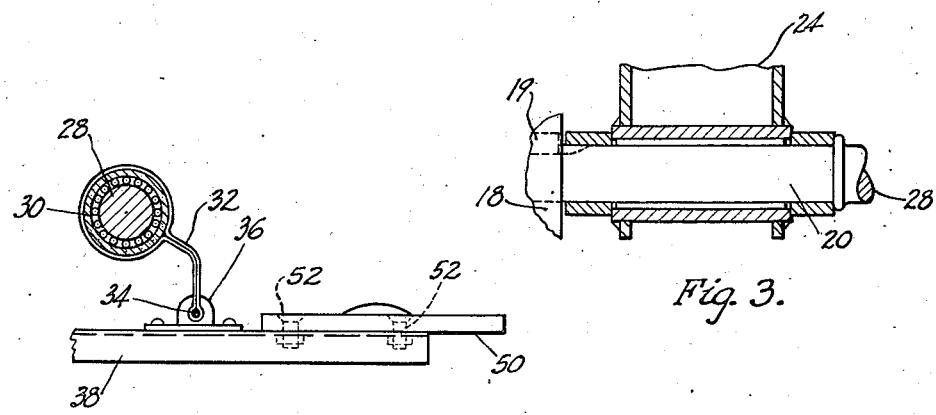
Figure 3 is a sectional detail view, on an enlarged scale, showing one of the crank axle bearings for the main supporting wheels.
Figure 4 is an enlarged sectional detail view showing the connections between one of the treadle members and the corresponding crank portion of the crank axle.
Figures 5, 5A:
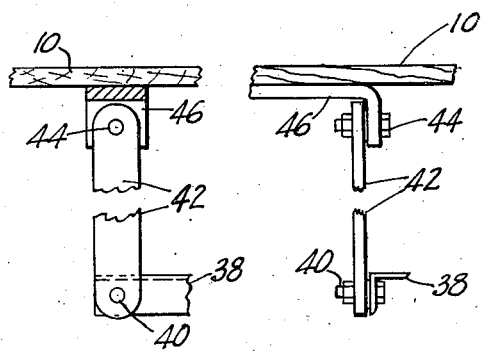
Figure 5 is a detail view showing one of the pivotal suspension connections between the treadle means and the vehicle body.
Figure 5A is a similar view, taken in a plane at right angles to the plane of Figure 5.

The front ends of the treadle members 38 project some distance forward of the links 32, where they are provided with suitable tread plates 50 attached in horizontal position by means of bolts 52 to said front ends of the treadles, as shown in Figures 1 and 4.

Figure 6:
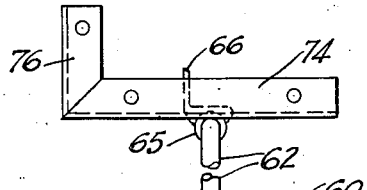
Figure 6 is a detail plan view of the supporting means and connections for the rear supporting and steering wheel of the vehicle.
Figure 7:
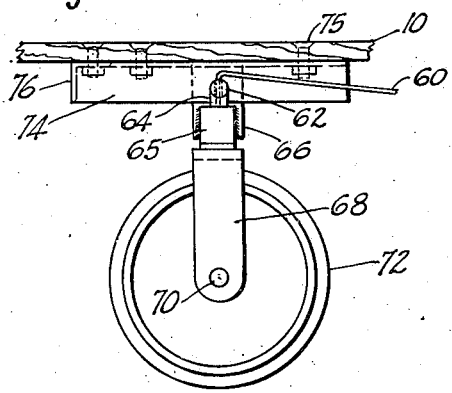
Figure 7 is a side elevation showing the same parts as illustrated in Figure 6.

The steering mechanism comprises a steering arm or lever 54 projecting up into convenient operative position alongside the seat unit 12, and fulcrumed on a pivot bolt 56 at one side of the wagon bed 10 with its lower end portion traveling in a guide or keeper 58 carried by one of the channel pieces 24, as illustrated in Figures 1 and 2. To the extreme lower end of said lever 54 is pivotally connected the front end of a rod 60 which extends rearwardly and is pivoted to the free end of a horizontally and laterally extending arm 62. This arm 62 is rigid with the upper end of a vertical spindle 64 mounted in a bushing 65 which is rigid with a bracket piece 66, as illustrated in Figures 6 and 7. The lower end of said spindle 62 carries a fork 68 provided with a pin 70 for journaling a suitable supporting and steering wheel 72.

As will be seen from Figures 2 and 6, the vertical axis of the wheel 72, as represented by its spindle 64, is in the vertical plane of the central longitudinal line or axis of the vehicle body, for which purpose the bracket piece 66 supporting said spindle is appropriately secured to a longitudinal angle or frame member 74 secured by screws 75 to the bottom of the wagon bed at its middle portion. At its rear end said angle member 74 is provided with a lateral extension 76 projecting in an opposite direction from that of the wheel steering arm 62, or in such manner as tends to balance the operation of the steering mechanism.

In the operation of the wagon, and using the seat unit 12, the driver occupies the seat 14 and is thus in position to operate the propelling mechanism by placing his feet upon the tread plates 50 (as indicated in Figure 4), whereby the alternate operation of the treadles rotates the crank shaft and thus drives the wheel 18 which is rigid with said shaft. At the same time the vehicle is steered by operation of the lever 54 for controlling the position of the wheel 72 with reference to its vertical spindle axis, whereby a very accurate and sensitive guiding and steering action is obtained. The treadle members are mounted and supported by a double-pivoted supporting means for providing a maximum freedom of the treadle action, and moreover this character of supporting means affords a pivotal arrangement whereby a most efficient leverage or mechanical effort may be applied to the crank elements 28 for effecting the propelling action, as will be readily understood. Obviously, this operation of the treadles may be carried out conveniently by the driver in a comfortable sitting position, or such operation may be carried out by the same movements in a standing position, with the full weight of the driver applied to the treadles with corresponding increase in the power or mechanical effort transmitted to the propelling means; and in either position the driver will find the steering lever readily accessible for steering purposes. Again it may be pointed out that the vehicle may be operated and steered in either direction and of course the driver when in standing position may face in either direction, as desired, according to the direction of travel of the vehicle.

The seat unit being movable is adapted to be set in any desired or adjusted position, or completely removed from the wagonbed; and as one novel feature the lower rear portion of the seat structure is provided with a door 80 hinged as indicated at 82 in Figure 1, for operating as a closure for a storage space within the seat unit and below its seat portion 14.

Special applications of the invention would obviously be in the way of invalid or wheeled chairs, as well as a type of construction in the class of so-called exercisers for strengthening the mucles of convalescents or other persons having need of developing certain muscles of the body.

Having thus described my invention, what I claim and desire to secure by Letters-Patent is:

A self-propelled vehicle comprising a main body portion having main supporting wheels provided with treadle means at the front end of the body portion, a combination supporting and steering wheel having a vertical spindle intersecting the central longitudinal line of said body portion, a frame piece rotatively supporting said spindle and secured to said body portion along said central longitudinal line and having a laterally extending portion, an operating arm rigid with said spindle and projecting to one side of said body portion in a direction opposite to that of the laterally extending portion of said frame piece, and a steering lever at the front end of said body portion and provided with an operating connection with the outer free end of said arm.

JOHN C. RUMSEY.